(12) United States Patent
Harikumar et al.

(10) Patent No.: US 8,296,522 B2
(45) Date of Patent: Oct. 23, 2012

(54) METHOD, APPARATUS, AND SYSTEM FOR SHARED CACHE USAGE TO DIFFERENT PARTITIONS IN A SOCKET WITH SUB-SOCKET PARTITIONING

(75) Inventors: Ajay Harikumar, Bangalore (IN); Tessil Thomas, Karnataka (IN); Biju Puthur Simon, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 12/291,273

(22) Filed: Nov. 7, 2008

(65) Prior Publication Data

US 2009/0164730 A1 Jun. 25, 2009

(30) Foreign Application Priority Data

Dec. 20, 2007 (IN) .......................... 2678/DEL/2007

(51) Int. Cl.
*G06F 12/00* (2006.01)
*G06F 13/00* (2006.01)
(52) U.S. Cl. ......... 711/130; 711/118; 711/147; 718/104
(58) Field of Classification Search .................. 711/119, 711/130
See application file for complete search history.

(56) References Cited

U.S. PATENT DOCUMENTS

| | | | |
|---|---|---|---|
| 6,633,967 B1 | 10/2003 | Duncan | |
| 7,721,148 B2 | 5/2010 | Brenden et al. | |
| 7,853,755 B1 | 12/2010 | Agarwal et al. | |
| 2007/0038809 A1* | 2/2007 | Accapadi et al. | 711/129 |
| 2008/0134191 A1 | 6/2008 | Warrier et al. | |
| 2009/0164739 A1 | 6/2009 | Harikumar et al. | |
| 2009/0164747 A1 | 6/2009 | Harikumar et al. | |
| 2009/0164751 A1 | 6/2009 | Harikumar et al. | |
| 2011/0055488 A1* | 3/2011 | Vishin | 711/133 |
| 2011/0055827 A1* | 3/2011 | Lin et al. | 718/1 |

OTHER PUBLICATIONS

U.S. Patent and Trademark Office, Office Action mailed Jul. 26, 2011, with Reply filed Oct. 19, 2011 in U.S. Appl. No. 12/291,303.

* cited by examiner

*Primary Examiner* — Brian Peugh
*Assistant Examiner* — Prasith Thammavong
(74) *Attorney, Agent, or Firm* — Trop, Pruner & Hu, P.C.

(57) ABSTRACT

A cache that supports sub-socket partitioning is discussed. Specifically, the cache supports different quality of service levels and victim cache line selection for a cache miss operation. The different quality of service levels allow for programmable ceiling usage and floor usage thresholds that allow for different techniques for victim cache line selection.

17 Claims, 7 Drawing Sheets

METHOD, APPARATUS, AND SYSTEM FOR SHARED CACHE USAGE TO DIFFERENT PARTITIONS IN A SOCKET WITH SUB-SOCKET PARTITIONING

CROSS-REFERENCE TO RELATED APPLICATION

Pursuant to 35 U.S.C. §119, this application claims priority to Indian Application Serial No. 2678/DEL/2007, filed Dec. 20, 2007, the subject matter of which is incorporated herein by reference.

The present application is related to and may incorporate embodiments from three concurrently filed applications by the same set of inventors. The first application, is titled "METHOD, SYSTEM AND APPARATUS FOR MAIN MEMORY ACCESS SUBSYSTEM USAGE TO DIFFERENT PARTITIONS IN A SOCKET WITH SUB-SOCKET PARTITIONING", Ser. No. 12/291,306, filed concurrently herewith. The second application, is titled "METHOD, SYSTEM, AND APPARATUS FOR USABILITY MANAGEMENT IN A SYSTEM WITH SUB-SOCKET PARTITIONING", Ser. No. 12/291,272, filed concurrently herewith. The third application, is titled "METHOD, SYSTEM, AND APPARATUS FOR MEMORY ADDRESS MAPPING SCHEME FOR SUB-SOCKET PARTITIONING", Ser. No. 12/291,303, filed concurrently herewith.

BACKGROUND

Embodiments of the invention relate to the field of partitioning, and according to one embodiment, a method and apparatus, and system for shared cache usage to different partitions in a socket with sub-socket partitioning.

As modern microprocessors become increasingly faster with growing number of cores, it becomes feasible from a performance viewpoint to run multiple operating systems on the same hardware. This ability opens up many possibilities including Server consolidation and ability to run services Operating Systems in parallel to the main Operating System. Providing this ability can be done either in software or in hardware. In software it is done using virtualization mechanisms by running a Virtual Machine Monitor (VMM) underneath the Operating Systems. The present partitioning software schemes partition only down to a socket granularity. Unfortunately, partitioning for a socket that contains and integrated device or system with multiple processor cores is limited at the socket level and precludes partitioning down to a particular core within the processor or socket.

BRIEF DESCRIPTION OF THE DRAWINGS

The invention may best be understood by referring to the following description and accompanying drawings that are used to illustrate embodiments of the invention.

DETAILED DESCRIPTION

In the following description, certain terminology is used to describe features of embodiments of the invention. For example, the term "device" or "agent" are general used to describe any electrical component coupled to a link. A "link or interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

The term "home agent" is broadly defined as a device that provides resources for a caching agent to access memory and, based on requests from the caching agents, can resolve conflicts, maintain ordering and the like. The home agent includes a tracker and data buffer(s) for each caching agent as described below. A "tracker" is dedicated storage for memory requests from a particular device. For instance, a first tracker may include a plurality of entries associated with a first caching agent while a second tracker may include other entries associated with a second caching agent. According to one embodiment of the invention, the "caching agent" is generally a cache controller that is adapted to route memory requests to the home agent.

The term "logic" is generally defined as hardware and/or software that perform one or more operations such as controlling the exchange of messages between devices. When deployed in software, such software may be executable code such as an application, a routine or even one or more instructions. Software may be stored in any type of memory, normally suitable storage medium such as (i) any type of disk including floppy disks, magneto-optical disks and optical disks such as compact disk read-only memories (CD-ROMs), compact disk rewritables (CD-RWs), digital versatile disks (DVDs), (ii) any type of semiconductor devices such as read-only memories (ROMs), random access memories (RAMs), erasable programmable read-only memories (EPROMs), flash memories, electrically erasable programmable read-only memories (EEPROMs), (iii) magnetic or optical cards, or (iv) any other type of media suitable for storing electronic instructions.

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
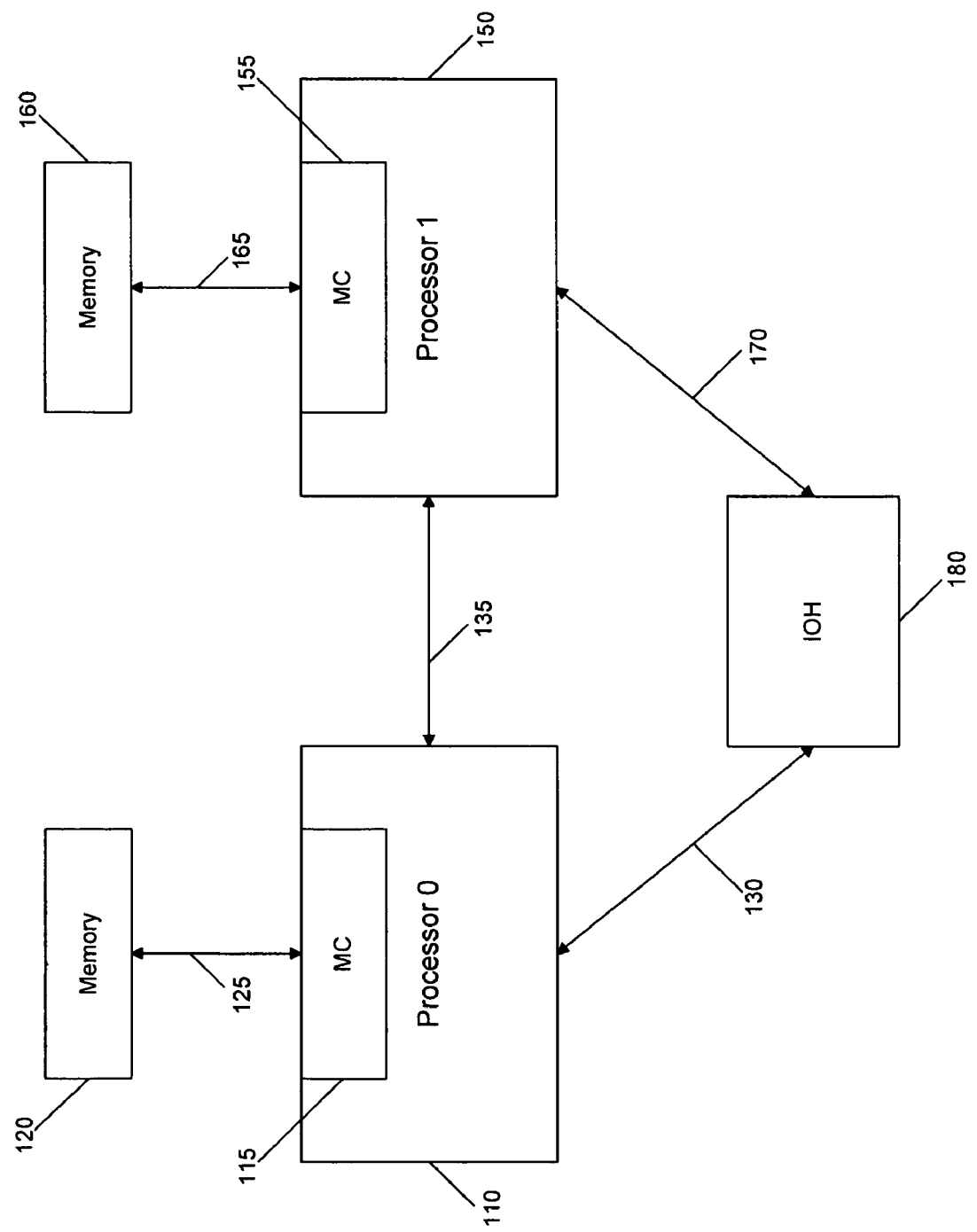
FIG. 1 is an exemplary block diagram of a dual processor system in accordance with an embodiment of the invention.

Referring to FIG. 1, an exemplary block diagram of a system in accordance with one embodiment of the invention is shown. Herein, system 100 is illustrated as a dual processor (DP) system 100 representing a variety of platforms. For instance, DP system 100 may be associated with a desktop or mobile computer, a server, a set-top box, personal digital assistant (PDA), alphanumeric pager, cellular telephone, or any other type of wired or wireless communication devices.

As shown, according to one embodiment of the invention, DP system 100 comprises a pair of processors such as a first processor 110 and a second processor 150 for example. Each processor 110 and 150 includes a memory controller (MC) 115 and 155 to enable direct communications with an associated memory 120 and 160 via links 125 and 165, respectively. Moreover, the memories 120 and 160 may be independent memories or portions of the same shared memory.

As specifically shown in FIG. 1, processors 110 and 150 are coupled to an input/output hub (IOH) 180 via point-to-point links 130 and 170, respectively. IOH 180 provides connectivity between processors 110 and 150 and input/output (I/O) devices implemented within DP system 100. In addition, processors 110 and 150 are coupled to each other via a point-to-point link 135. According to one embodiment of the invention, these point-to-point links 130, 135, 170 may be adapted to operate in accordance with "Quickpath" specification developed by Intel Corporation of Santa Clara, Calif. However, the claimed subject matter is not limited to a Quickpath link and may utilize any type of link or interconnect.

Figure 2:
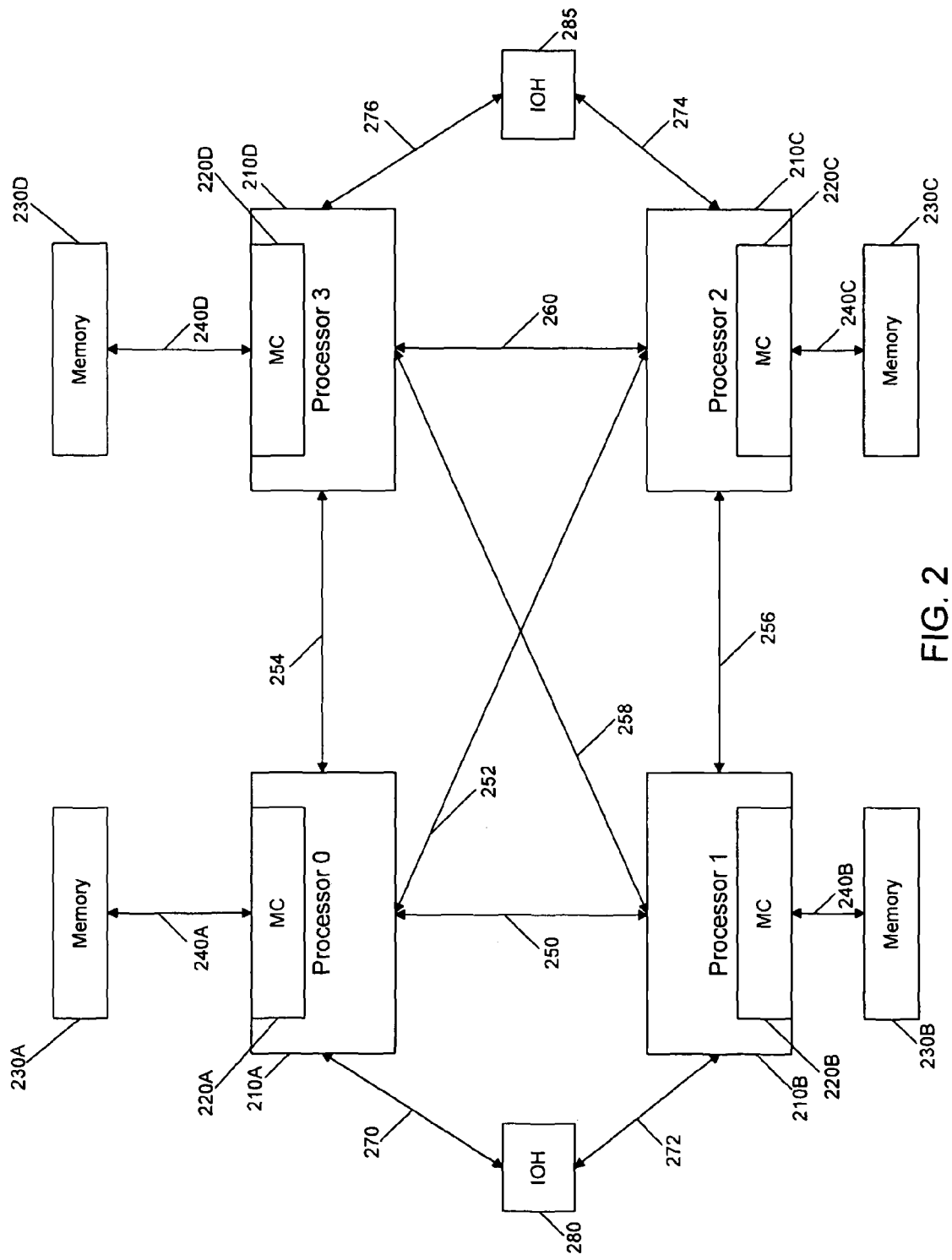
FIG. 2 is an exemplary block diagram of a multi-processor system in accordance with an embodiment of the invention.

Referring now to FIG. 2, an exemplary block diagram of a multiprocessor (MP) system 200 in accordance with one embodiment of the invention is shown. Similarly, MP system 200 may be a desktop or mobile computer, a server, a set-top box, personal digital assistant (PDA), alphanumeric pager, cellular telephone, or any other type of wired or wireless communication devices.

Herein, according to one embodiment of the invention, MP system 200 comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively.

Additionally, processor 210A is coupled to each of the other processors 210B-210D via point-to-point (e.g., POINT TO POINT) links 250, 252 and 254. Similarly, processor 210B is coupled to processors 210A, 210C and 210D via POINT TO POINT links 250, 256 and 258. Processor 210C is coupled to processors 210A, 210B and 210D via POINT TO POINT links 252, 256 and 260. Processor 210D is coupled to processors 210A, 210B and 210C via POINT TO POINT links 254, 258 and 260. Processors 210A and 210B are coupled via point-to-point interconnects 270 and 272 to a first input/output hub (IOH) 280 while processors 210C and 210D are coupled via point-to-point interconnects 274 and 276 to a second IOH 285.

For both systems 100 and 200 described in FIGS. 1 and 2, it is contemplated that the processors may be adapted to operate as a home agent, a caching agent or both, depending on the system architecture selected.

Figure 3:
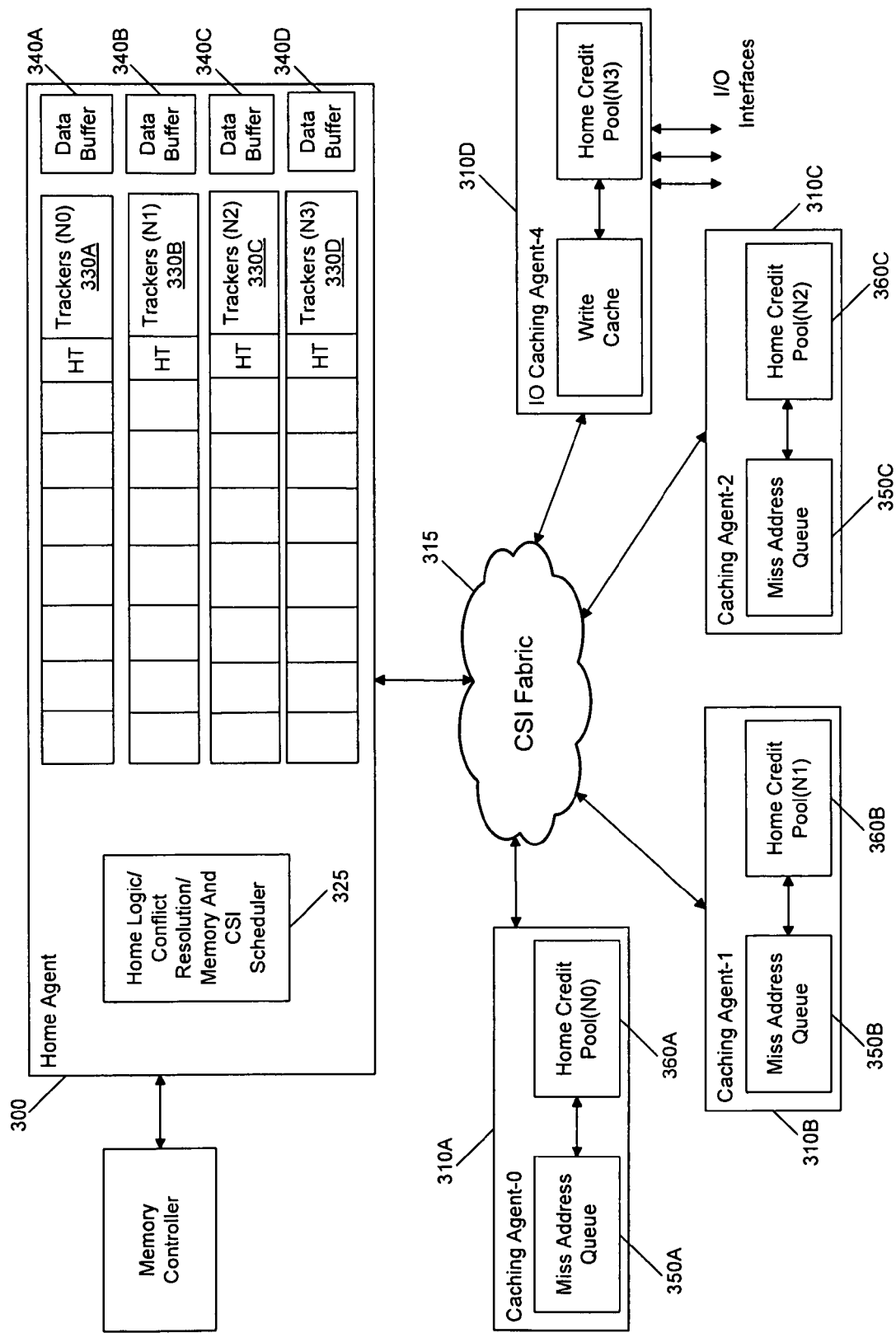
FIG. 3 is an exemplary embodiment of architectures for home and caching agents of the systems of FIGS. 1-2 in accordance with an embodiment of the invention.

Referring now to FIG. 3, an exemplary embodiment of architectures for destination and source devices of the systems of FIGS. 1-2 in accordance with an embodiment of the invention is shown. For illustrative purposes, processor 210D (or processor 150) is configured as a destination device 300, such as a home agent for example. Processors 210A-210C (or processor 110) could be configured as sources 310A-310C, such as caching agents for example. IOH 280 or 285 (or IOH 180 of FIG. 1) may be configured as I/O device 310D implementing a write cache 320 operates as a caching agent as well.

As described below, each source 310A, . . . , or 310D is associated with a tracker that is maintained at destination device 300 and has a predetermined number of tracker entries. The number of tracker entries is limited in size to the number of requests that may be transmitted by any source 310A, . . . , or 310D that saturates the bandwidth of a POINT TO POINT fabric 315, which supports point-to-point communications between destination 300 and the plurality of sources (e.g., sources 310A-310D).

As shown in FIG. 3, according to this embodiment of the invention, destination 300 is a home agent that comprises home logic 325 and a plurality of trackers $330_1 \ldots 330_M$, where $M \geq 1$. In combination with trackers $330_1 \ldots 330_M$, home logic 325 is adapted to operate as a scheduler to assist in the data transfer of incoming information from memory 230A of FIG. 2 and outgoing information to POINT TO POINT fabric 315. Moreover, home logic 325 operates to resolve conflicts between these data transfers.

Herein, for this embodiment of the invention, since four (4) caching agents 310A-310D are implemented within system 100/200, four (M=4) trackers are illustrated and labeled "HT-0" 330A, "HT-1" 330B, "HT-2" 330C and "HT-3" 330D. These trackers 330A-330D each contain N0, N1, N2 and N3 tracker entries respectively, where $Ni \geq 1$ (i=1,2,3 or 4). The number of entries (N0-N3) may differ from one tracker to another. Associated with each entry of trackers 330A-330D is a corresponding data buffer represented by data buffers 340A-340D. Data buffers 340A-340D provide temporary storage for data returned from memory controller 220A, and eventually scheduled onto POINT TO POINT fabric 315 for transmission to a targeted destination. The activation and deactivation of the entries for trackers 330A-330D is controlled by home logic 325 described below.

Caching agents 310A, 310B, and 310C include a miss address queue 350A, 350B, and 350C, respectively. For instance, with respect to caching agent 310A, miss address queue 350A is configured to store all of the miss transactions that are handled by home agent 300.

In addition, according to this embodiment of the invention, caching agents 310A, 310B and 310C further include a credit counter 360A, 360B and 360C, respectively. Each credit counter 360A, 360B, and 360C maintains a count value representative of the number of unused tracker entries in trackers 330A, 330B, and 330C. For instance, when a new transaction is issued by caching agent 310A to home agent 300, credit counter 360A is decremented. If a transaction completes, then credit counter 360A is incremented. At reset time, credit counter 360A is initialized to the pool size equal to the number of tracker entries (NO) associated with tracker 330A. The same configuration is applicable to credit counters 360B-360C.

Also shown in FIG. 3 is an example of caching agent 310D operating as an I/O agent that reads information from memory and writes information to an I/O interface. Alternately, caching agent 310D may stream I/O agent read returns as writes into the main memory. Caching agent 310D implements write cache 320, which is used to sustain high bandwidth while storing data associated with I/O operations.

Figure 4:
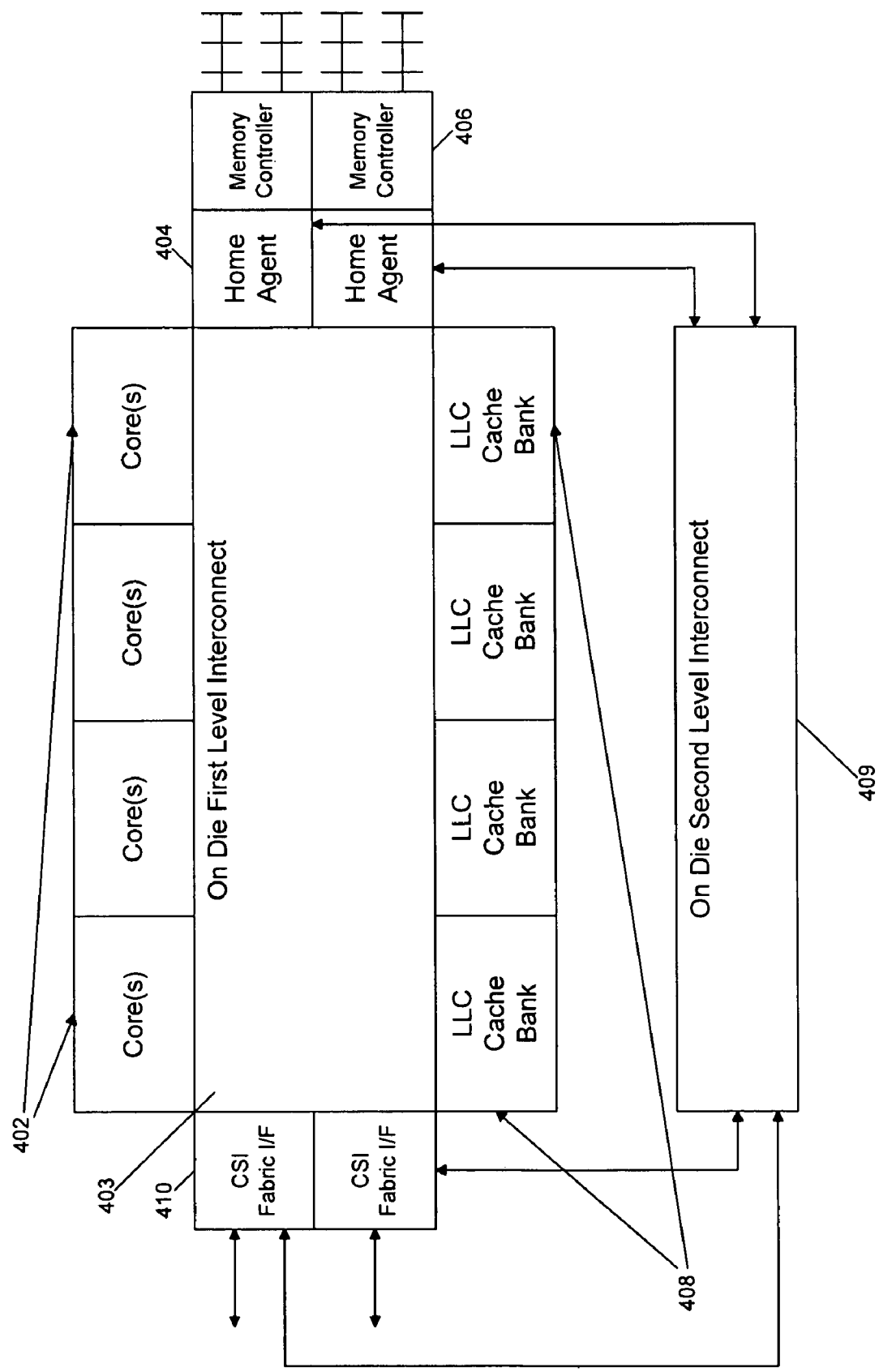
FIG. 4 is a socket architecture in accordance with an embodiment of the invention.

FIG. 4 is a socket architecture in accordance with an embodiment of the invention. In one embodiment, a dual processor system with each processor socket having processor cores 402. In one embodiment, at least two different operating systems may operate within each socket, such that, one or more cores or running different operating systems. In this embodiment, a partition identifier is assigned to each partition. The cores and the distributed last level cache banks 408 are connected to each other within the socket by a first level interconnect. In one embodiment, the first level interconnect is an on-die ring interconnect is utilized. In anther embodiment, the first level interconnect is a two dimensional mesh/cross bar. The memory controller is integrated into the processor die and Quickpath/POINT TO POINT protocol is used for inter-processor communication and IO access. The fabric interfaces 410 and the home agent are also connected to the first level interconnect. The home agents 404 and the fabric interfaces are connected to each other via a second level interconnect. In summary, the first level interconnect may be used to connect the cache memory, home agents and the off chip links to the processor cores, and the second level interconnects are used for connecting the home agent directly to the off chip links.

Figure 5:
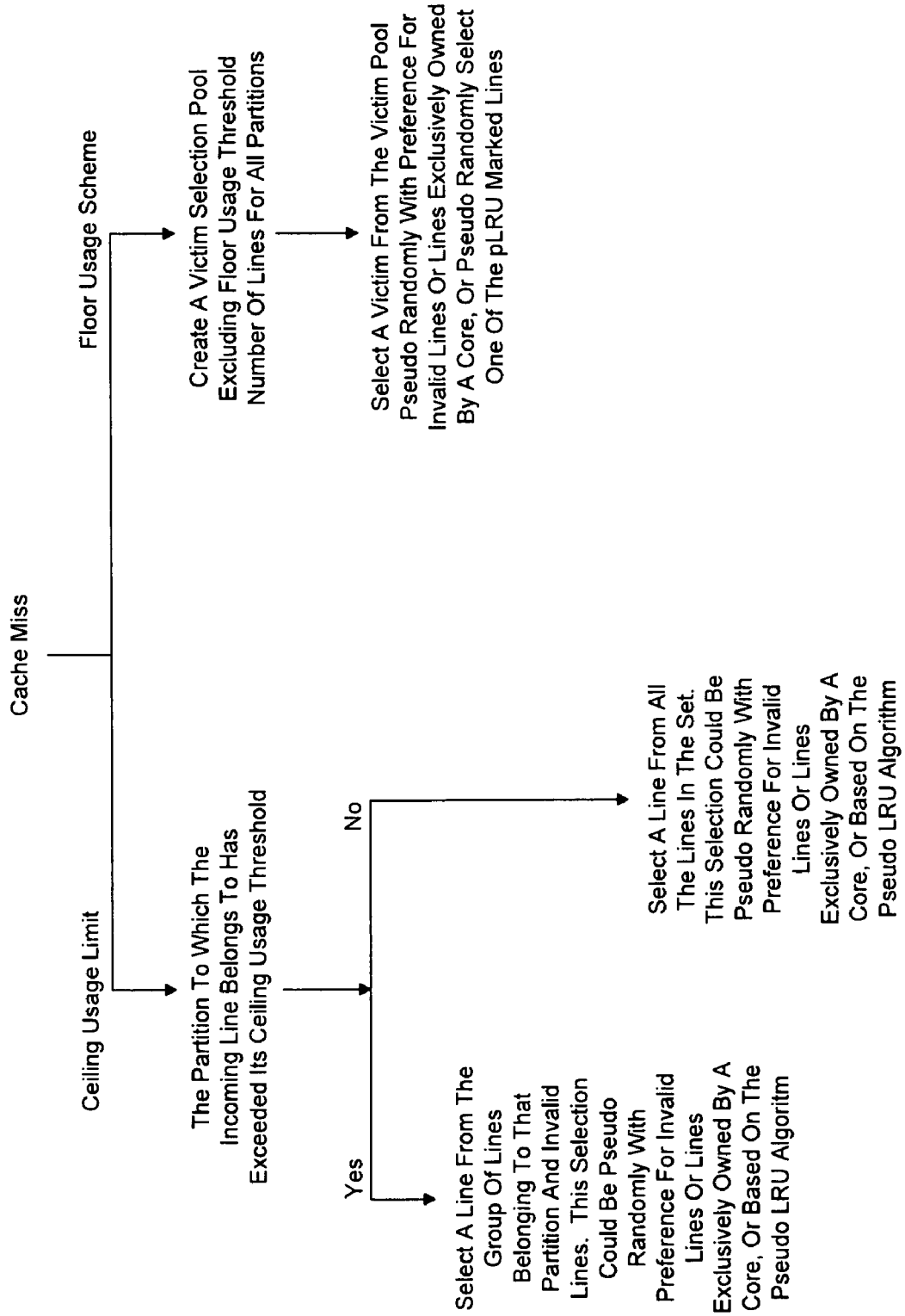
FIG. 5 is a method for victim selection for two schemes in accordance with an embodiment of the invention.

FIG. 5 is a method for victim selection for two schemes in accordance with an embodiment of the invention. In one embodiment, the last level cache banks 408 are shared among various partitions in the socket. In one embodiment, the claimed subject matter provides different quality of service levels to different partitions in shared cache usage. For example, two methods are discussed in the following paragraphs that allow for different quality of service levels for different partitions in shared cache usage.

The first method is a ceiling usage limit based policy. For example, an analysis for a cache miss will be described. First, the number of cache lines in a set belonging to a partition is compared to a programmable threshold for that partition. In the event the number of cache lines is below the threshold, then an incoming cache line that belongs to that partition results in a selection of a victim line among all of the lines in the set to be evicted. The selection of the victim line could be pseudo randomly made with a preference for invalid lines, or for lines exclusively owned by a processor core, or based on a pseudo LRU (Least Recently used) method.

Otherwise, if the number of cache lines in a set belonging to a partition has exceeded the programmable threshold for that partition, a victim line is selected from among lines belonging to that corresponding partition associated with the incoming line. The selection of the victim line could be pseudo randomly made with a preference for invalid lines, or for lines exclusively owned by a processor core, or based on a pseudo LRU (Least Recently used) method.

Therefore, this allows each partition to grow towards the ceiling allowed usage and once they reach that usage, the partition is automatically limited from unfairly using more lines than the max usage permitted.

The second method is a floor usage limit based policy. For example, each partition has a programmable floor usage threshold. The sum of the floor usage thresholds of all the partitions that share the cache should be less than or equal to the number of ways in the set. If the sum is less than the total number of ways in the set, then the remainder can be allocated to any partition dynamically. In this method for a cache miss, a victim line is selected from the group of lines which belong to the following partitions that have exceeded their minimum usage threshold and/or invalid lines. The selection of the victim line could be pseudo randomly made with a preference for invalid lines, or for lines exclusively owned by a processor core, or based on a pseudo LRU (Least Recently used) method. Therefore, partitions gravitate toward the floor usage level. Subsequently, when the partitions reach the floor usage threshold, the partitions compete for the free pool of available ways.

In one embodiment, each way in the set will have a partition id field along with the tag. On a cache miss, to find the victim line, the following flow is used for the floor usage limit method. For each partition, a number of lines corresponding to the floor usage threshold is excluded from the group of lines belonging to that partition. In one embodiment, each partition will have its own floor usage threshold. This exclusion group will have the most recently used line and (floor usage threshold−1) other lines. Therefore, each partition keeps track of the Most Recently Used (MRU) Line. In one embodiment, if a partition has not yet reached its floor usage threshold, then its line will be completely excluded. The lines other than the most recently used will be selected either from the set of lines belonging to the partition above the MRU line or from the set of lines belonging to the partition below the MRU line. For example, if the MRU line of a partition is 4 and the min usage threshold of that partition is 3 and the number of lines in the set is 8, and the lines 0, 2, 4, 7 belongs to this partition, then two possible choices are 4, 7, 0 or 0, 2, 4. The choice between above and below the MRU line is done pseudo randomly. After the exclusion, the victim can be selected from the remaining lines in the set in the following fashion:

First, use an available invalid line. Otherwise, if a random algorithm is enabled, select a line randomly according to the random algorithm. Otherwise, select a line exclusively owned by a core if present, otherwise, select a line randomly if random with exclusive preselect is enabled.

Alternatively, in another embodiment that utilizes a pseudo LRU algorithm, then each partition tracks the Pseudo Least Recently Used Line and in forming the exclusion group, it excludes floor limit threshold lines above or below the pLRU line. This ensures that the pLRU line is part of the pool from which the victim line is selected.

In one aspect, a floor usage threshold based scheme may result in concealing the full image of the cache foot print of any partition despite if side channel attacks are attempted from other partitions by forcing evictions. Here the QoS parameter is the min usage threshold. There can be cache lines belonging to more than one partition, for cache occupancy determination, such lines are considered as part of the cache usage of each partition separately. For example, if a cache line belongs to both partition 0 and 1, then that cache line is counted in the usage of both partition 0 and 1, for determining which line to evict next.

In one embodiment, cache lines belong to more than one partition. For cache occupancy determination, such lines are considered as part of the cache usage of each partition separately. For example, if a cache line belongs to both partition 0 and 1, then that cache line is counted in the usage of both partition 0 and 1, for determining subsequent victim line eviction.

Figure 6:
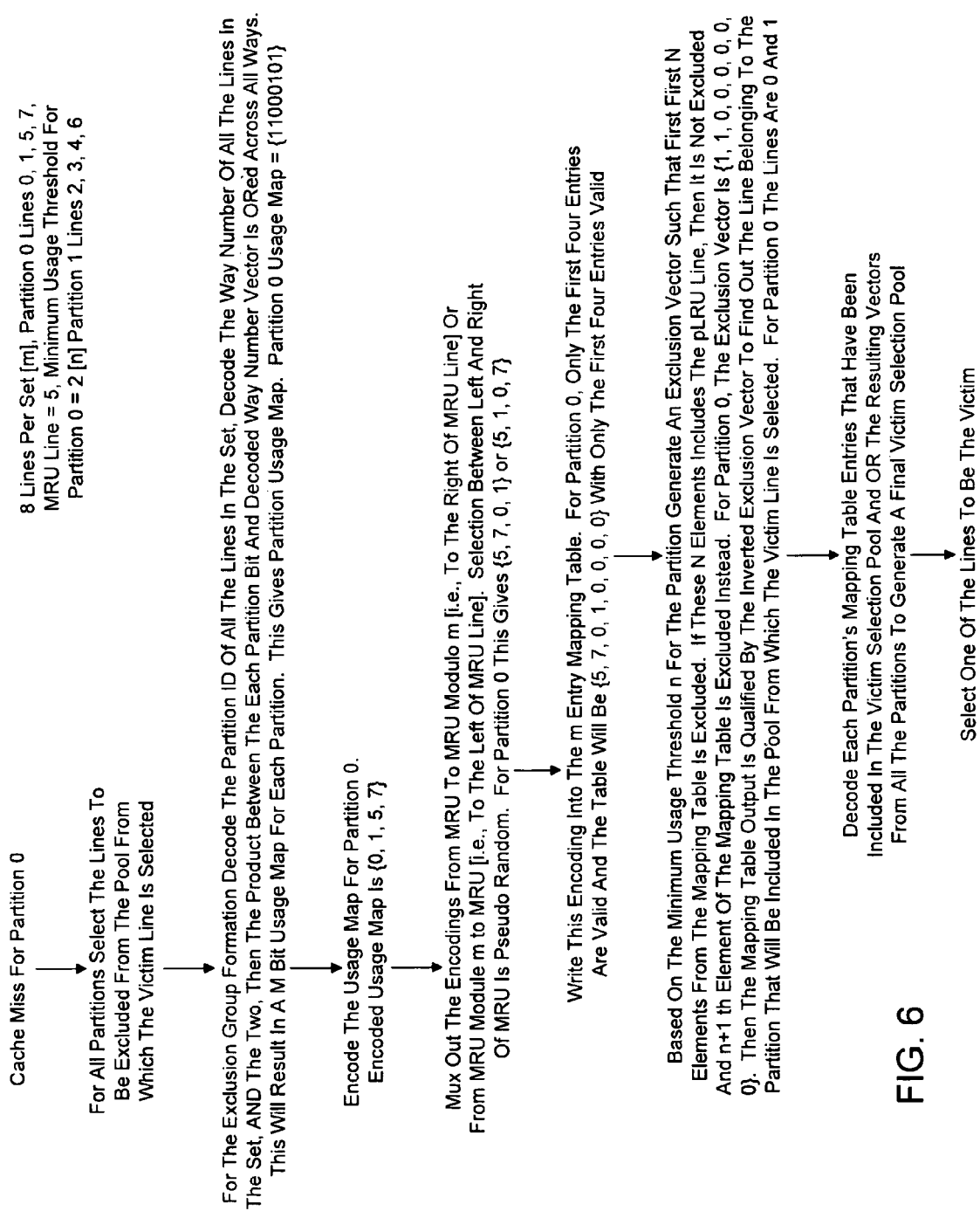
FIG. 6 is a method for victim selection for a particular partition in accordance with an embodiment of the invention.

FIG. 6 is a method for victim selection for a particular partition in accordance with an embodiment of the invention.

In this example, there are 8 (designated as "m") lines per set, Partition 0 lines are 0, 1, 5, 7, MRU line=5, floor usage threshold for partition 0=2 (designated as "n"), and Partition 1 lines are 2, 3, 4, 6. However, the claimed subject matter is not limited to this set of variables. One skilled in the art appreciates different number of lines per set and different partition numbers.

First, select the lines to be excluded from the victim line selection pool for all the partitions. For this exclusion group formation, decode the partition identifier of all the lines in the set, decode the way number of all the lines in the set, logically AND the two, then the product between the each partition bit and decoded way number vector is ORed across all ways. Consequently, this result in a m bit usage map for each partition. Therefore, this results in a partition usage map Partition 0 usage map of {11000101}.

Next, the usage map is encoded for the partition which results in {0,1,5,7}. Subsequently, the next block multiplexes out the encodings from MRU to MRU modulo m. Next, the encoding is written into an m entry mapping table. An exclusion vector is generated based on the first n elements from the mapping table being excluded. Next, decoding of each partition's mapping table entries eventually results in the selection of a victim line.

To select the victim line, the flowchart allows for a selection of an available invalid line. Otherwise, pseudo randomly select one among the pLRU lines of various partitions available in the victim selection pool.

In one embodiment, both MRU and pLRU are tracked for each partition, then the exclusion group can be formed such that the MRU line is always included in it and the pLRU line is excluded.

In one embodiment for isolation between partitions for cache operations like Cache flush, Cache init, and Writeback invalidate (wbinvd instruction) only the lines which belong to the partition which issued the cache operation will be considered for the operation. Any snoop probes for a line belonging to a particular partition is send to cores belonging to that partition. For a line shared between partitions the cache operation of any of the partitions to which it belongs to will considered be considered valid and applied.

Figure 7:
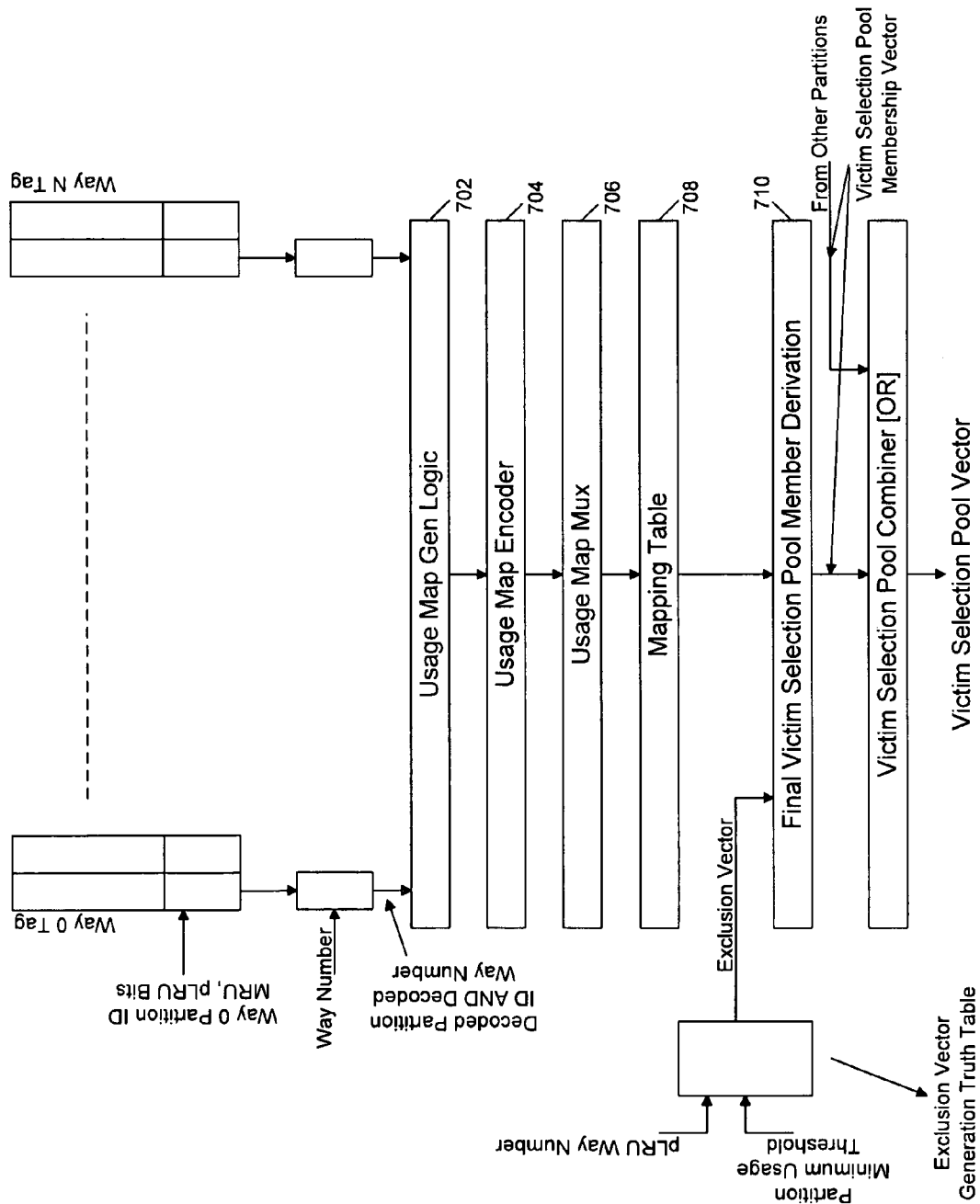
FIG. 7 is a block diagram to support the methods depicted in FIGS. 5 and 6.

FIG. 7 is a block diagram to support the methods depicted in FIGS. 5 and 6. As discussed in FIG. 6, the exclusion group formation is performed in block 702. The usage map is encoded for the partition is performed in block 704 and block 706 multiplexes out the encodings from MRU to MRU modulo m. The encoding is written into an m entry mapping table, as depicted by block 708. An exclusion vector is generated based on the first n elements from the mapping table being excluded and is an input to block 710. Next, decoding of each partition's mapping table entries eventually results in the selection of a victim line.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for forming a victim selection pool for a cache within a socket that supports multiple partitions comprising:
    selecting a pool of cache lines to be excluded from a victim line selection pool for the multiple partitions;
    generating a usage map for a particular partition;
    generating an exclusion vector based at least in part on a programmable floor usage threshold; and
    generating the victim selection pool based at least in part on decoding each of the multiple partition's mapping table entries that have been included in the victim line selection pool and performing a logical OR operation on a plurality of vectors from the multiple partitions.

2. The method of claim 1 wherein the pool of cache lines to be excluded comprises decoding a partition identifier of all the cache lines in a set of the cache and decoding a way number of all the cache lines in the set.

3. The method of claim 1 wherein generating a usage map for a particular partition comprises:
    encoding the usage map for the partition that has a cache miss; and
    multiplexing out encodings from a most recently used format based on m number of cache lines per cache set and writing the encoding into an m entry mapping table.

4. The method of claim 1 wherein generating an exclusion vector based at least in part on a programmable floor usage threshold comprises:
    excluding the first n elements from the mapping table, wherein n is the programmable floor usage threshold.

5. A method to support multiple usage schemes for sub-socket partitioning comprising:
    storing a programmable floor usage threshold for a partition;
    storing a programmable ceiling usage threshold for the partition;
    determining whether the partition of an incoming line for a cache miss operation has exceeded its programmable ceiling usage threshold; and
    creating a victim selection pool for the cache miss operation by excluding a number of cache lines based at least in part on the programmable floor usage threshold.

6. The method of claim 5 wherein determining whether the partition of an incoming line for a cache miss operation has exceeded its programmable ceiling usage threshold further comprises:
    selecting a line from a group of cache lines that belong to the partition of the incoming line if the partition has exceeded its programmable ceiling usage threshold, otherwise, selecting line from all the cache lines in the set.

7. A caching agent to form a victim cache line pool for a cache miss operation and to support sub-socket partitioning comprising:
    a first hardware logic to generate an usage map for a victim exclusion pool of cache lines;
    a second hardware logic to encode the usage map;
    a third hardware logic to adjust the encoded usage map based at least in part on a most recently used status and a number of cache lines in a set;
    a fourth hardware logic to generate an exclusion vector based at least in part on a floor usage threshold; and
    a fifth hardware logic to form the victim exclusion pool based at least in part on vectors from all partitions.

8. The caching agent of claim 7 wherein the first hardware logic to generate a usage map for a victim exclusion pool of cache lines comprises:
    a decoder to decode partition identifiers of all cache lines in a set and to decode a way number of all cache lines in the set.

9. The caching agent of claim 7 wherein the second hardware logic to encode the usage map is for a particular partition that had the cache miss operation.

10. The caching agent of claim 7 wherein the third hardware logic to multiplex out encodings from either most recently used to most recently used modulo m or from most recently used modulo m to most recently used, wherein m is the number of cache lines per set.

11. The caching agent of claim 7 wherein the fourth hardware logic to generate an exclusion vector based at least in part on a floor usage threshold such that a first n elements from the usage map are excluded, wherein n is the floor usage threshold.

12. A system with at least one socket to support sub-socket partitioning comprising:
    a processing agent with a plurality of processor cores;
    a dynamic random access memory, coupled to the processing agent;
    at least a first operating system and a second operating system to operate on at least two partitions within the processing agent; and
    a caching agent, coupled to the processing agent, to be shared among the partitions, and to create a victim cache line pool for a cache miss operation based at least in part on a most recently used status and a partition identifier.

13. The system of claim 12 wherein the caching agent comprises:

a first logic to generate a usage map for a victim exclusion pool of cache lines;
a second logic to encode the usage map;
a third logic to adjust the encoded usage map based at least in part on a most recently used status and a number of cache lines in a set;
a fourth logic to generate an exclusion vector based at least in part on a floor usage threshold; and
a fifth logic to form the victim exclusion pool based at least in part on vectors from the at least two partitions.

14. The system of claim 13 wherein the first logic to generate a usage map for a victim exclusion pool of cache lines comprises:
a decoder to decode partition identifiers of all cache lines in a set and to decode a way number of all cache lines in the set.

15. The system of claim 13 wherein the second logic to encode the usage map is for a particular partition that had the cache miss operation.

16. The system of claim 13 wherein the third logic is to multiplex out encodings from either most recently used to most recently used modulo m or from most recently used modulo m to most recently used, wherein m is the number of cache lines per set.

17. The system of claim 13 wherein the fourth logic to generate an exclusion vector based at least in part on a floor usage threshold such that a first n elements from the usage map are excluded, wherein n is the floor usage threshold.

* * * * *